United States Patent
Ma et al.

(10) Patent No.: US 10,776,180 B1
(45) Date of Patent: Sep. 15, 2020

(54) EXPRESSION-BASED FEATURE TOGGLE IN AN APPLICATION PROGRAMMING INTERFACE (API)

(71) Applicant: EMC IP HOLDING COMPANY LLC, Hopkinton, MA (US)

(72) Inventors: Qiang Ma, Chengdu (CN); James Pendergraft, Raleigh, NC (US); Hao Sun, Shanghai (CN); Jichao Zhang, Shanghai (CN); Chun Wei, Suzhou (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/665,455

(22) Filed: Oct. 28, 2019

(51) Int. Cl.
    *G06F 9/54*     (2006.01)
    *G06F 9/38*     (2018.01)
    *G06F 16/907*     (2019.01)
    *G06F 9/50*     (2006.01)
    *G06F 9/46*     (2006.01)

(52) U.S. Cl.
    CPC ............ *G06F 9/541* (2013.01); *G06F 9/3838* (2013.01); *G06F 9/468* (2013.01); *G06F 9/5005* (2013.01); *G06F 16/907* (2019.01)

(58) Field of Classification Search
None
See application file for complete search history.

(56) References Cited

U.S. PATENT DOCUMENTS 10,262,155 B1 * 4/2019 Sun .................. G06F 21/629
2019/0087478 A1 * 3/2019 Daniel ............... G06F 16/2433

* cited by examiner

*Primary Examiner* — Craig C Dorais
(74) *Attorney, Agent, or Firm* — Daly, Crowley Mofford & Durkee, LLP

(57) ABSTRACT

An aspect includes identifying one or more dependencies, via a feature toggle component of an application programming interface (API), with respect to features associated with a set of resources. An aspect also includes populating identified dependencies within a metadata table corresponding to the API and defining a multi-level access control feature for the resource. The multi-level access control includes a top level that identifies the resource, and a mid level that identifies a first set of properties for the resource. An aspect further includes populating fields in the metadata table with the first set of properties and a corresponding mid-level indicator, and enabling access to the resource at varying levels of granularity based on the identified dependencies in the metadata table for the resource and the mid level-indicator for the first set of properties.

20 Claims, 4 Drawing Sheets

400

| COLUMN | DESCRIPTION |
|---|---|
| ID | ELEMENT ID |
| FEATURE ID | THE FEATURE REQUIRED BY THE ELEMENT |
| LS_AND | TRUE/FALSE. TRUE INDICATES THE AND RELATIONSHIP AMONG THE REQUIRED FEATURES |
| LEVEL | THE ELEMENT LEVEL.<br>0 = RESOURCE (CLASS) LEVEL<br>1 = PROPERTY/METHOD LEVEL<br>2 = METHOD ARGUMENT LEVEL |

| ID | FEATURE ID | LS_AND | LEVEL |
|---|---|---|---|
| FILESYSTEM | F1 | T | 0 |
| FILESYSTEM | F2 | T | 0 |
| FILESYSTEM.ATTRIBUTE_NAME | F3 | F | 1 |
| FILESYSTEM.ACTION_CREATE | F4 | F | 1 |
| FILESYSTEM.ACTION_CREATE.ARGUMENT_SIZE | F5 | T | 2 |

FIG. 5

EXPRESSION-BASED FEATURE TOGGLE IN AN APPLICATION PROGRAMMING INTERFACE (API)

BACKGROUND

A representational state transfer (REST) application programming interface (API) is a software architecture style associated with a client-server model. In a REST API, each element type on a server may be represented by a uniform resource locator (URL). Requests are sent from a client to the server using hypertext transfer protocol (HTTP) using HTTP verbs such as, GET, POST, PUT, and DELETE. These HTTP verbs may be used to read, post, delete, and update data to a server.

A REST API provides many advantages over other more restrictive architectural styles, such as simple object access protocol (SOAP). For example, a REST API enables users to expose existing functionality in a programmable way, such as exposing an existing API as a web service. Enabling clients to view the code for APIs is sometimes desirable because it enables customers to integrate APIs into automation workflow with greater ease.

In at least some existing systems, functionality supported by a REST API is exposed to all clients. This is problematic because not all features should be exposed to all clients. For example, some features may not be licensed by a particular user. In addition, there may be multiple different platforms of a given storage system release. Some features may not be supported by a particular product instantiation platform or packaging. A developer or product team may also wish to hide some immature features which are still under development.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect may provide a method for implementing an expression-based feature toggle for an application programming interface (API). The method includes identifying one or more dependencies, via a feature toggle component of an application programming interface (API), with respect to features associated with a set of resources. The method also includes populating identified dependencies within a metadata table corresponding to the API and defining a multi-level access control feature for the resource. The multi-level access control includes a top level that identifies the resource, and a mid level that identifies a first set of properties for the resource. The method further includes populating fields in the metadata table with the first set of properties and a corresponding mid-level indicator, and enabling access to the resource at varying levels of granularity based on the identified dependencies in the metadata table for the resource and the mid level-indicator for the first set of properties.

Another aspect may provide a system for implementing an expression-based feature toggle component of an application programming interface (API). The system includes a memory comprising computer-executable instructions and a processor executing the computer-executable instructions. The computer-executable instructions when executed by the processor cause the processor to perform operations. The operations include identifying one or more dependencies, via a feature toggle component of an application programming interface (API), with respect to features associated with a set of resources. The operations also include populating identified dependencies within a metadata table corresponding to the API and defining a multi-level access control feature for the resource. The multi-level access control includes a top level that identifies the resource, and a mid level that identifies a first set of properties for the resource. The operations further include populating fields in the metadata table with the first set of properties and a corresponding mid-level indicator, and enabling access to the resource at varying levels of granularity based on the identified dependencies in the metadata table for the resource and the mid level-indicator for the first set of properties.

A further aspect may provide a computer program product for implementing an expression-based feature toggle for an application programming interface (API). The computer program product is embodied on a non-transitory computer readable medium. The computer program product includes instructions that, when executed by a computer, cause the computer to perform operations. The operations include identifying one or more dependencies, via a feature toggle component of an application programming interface (API), with respect to features associated with a set of resources. The operations also include populating identified dependencies within a metadata table corresponding to the API and defining a multi-level access control feature for the resource. The multi-level access control includes a top level that identifies the resource, and a mid level that identifies a first set of properties for the resource. The operations further include populating fields in the metadata table with the first set of properties and a corresponding mid-level indicator, and enabling access to the resource at varying levels of granularity based on the identified dependencies in the metadata table for the resource and the mid level-indicator for the first set of properties

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIGS. 4 and 5 are tables illustrating feature requirements and metadata for an API in accordance with some embodiments.

DETAILED DESCRIPTION

Figure 1:
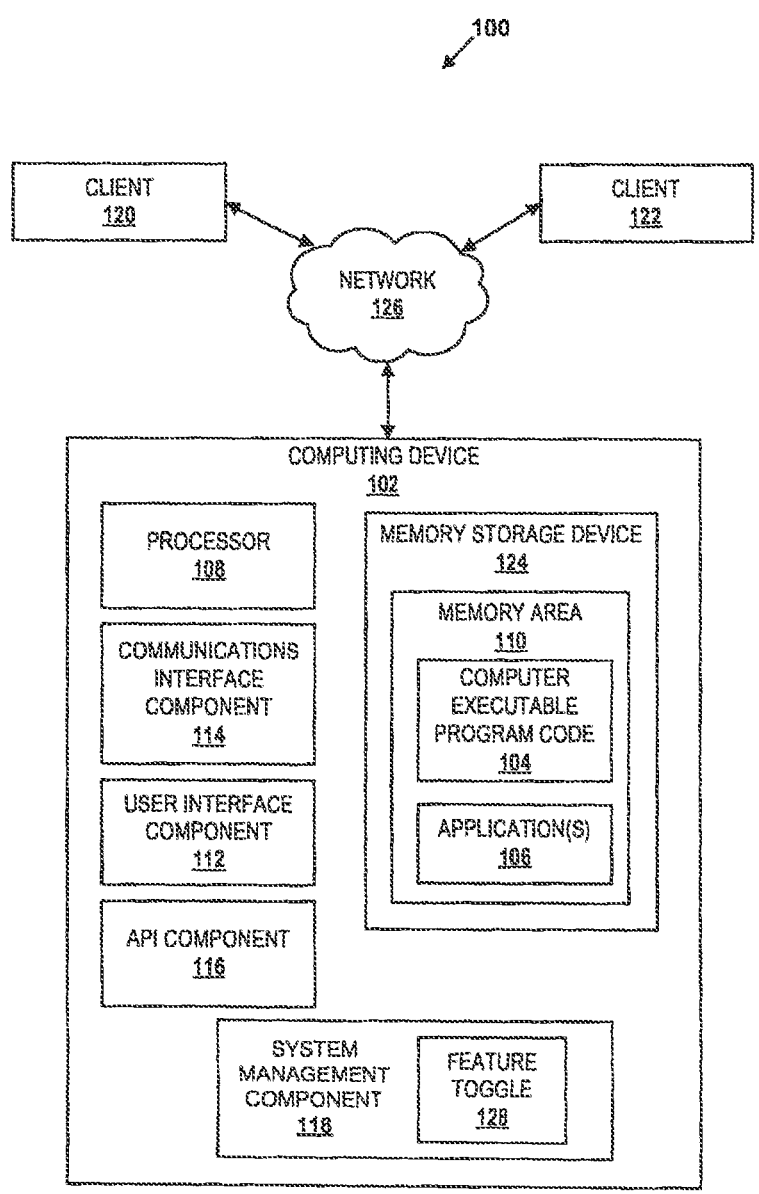
FIG. 1 is an exemplary block diagram illustrating a computing system for implementing an expression-based feature toggle component in an application programming interface (API) in accordance with some embodiments.

A feature toggle provides a means for enabling and disabling specific features associated with an application programming interface (API). Aspects of the embodiments provide a data storage system that may support a large number of different elements and their corresponding features. In some aspects of the embodiments, an element of a request transmitted via the API may include resource types, properties, methods (or functions), and method arguments. A feature may include an application, operation, or other function associated with one or more application programming inter-faces (APIs), such as a representational state (REST) API.

Feature toggle capability for an API may involve mapping an association between elements and features. For example, at build time, a developer maps a set of one or more features to each element in a plurality of elements associated with a computing system. This enables developers to map elements to features in the code. The feature toggle component improves the computer hardware and software development process by supporting feature team to change and/or plan the feature availability at any time of the agile development cycle. This further improves developer efficiency and experience developing and modifying features and feature availability. The feature toggle further enables a developer to control whether an individual feature is made available in a particular release at build time or made available to a particular client at runtime.

As disclosed in U.S. patent Ser. No. 10/262,155 (hereinafter patent '155'), a feature toggle is provided that parses a set of feature tags to identify a set of features associated with a given element. The feature tag identifies a feature mapped to or associated with an element. The feature toggle determines a current state of each feature in the set of features during runtime. The current state of each feature in the set of features is looked up in the system. The state of a given feature is enabled, disabled, or hidden based on certain criteria (e.g., the feature toggle checks hardware capabilities, software version capabilities, feature licenses, and black content to determine whether a given feature is enabled, disabled, or hidden). U.S. Pat. No. 10,262,155 is commonly assigned and is incorporated herein by reference in its entirety.

In patent '155, a feature may be disabled with regard to a particular user because the feature is not currently licensed by that particular user or the feature is disabled with regard to a particular system platform because that platform does not support that feature. In another example, some features may be immature features that are still under development and not ready for release or utilization by clients. These features may be referred to as black content and may have a hidden feature state.

Also in patent '155, an early validation is performed on element states. Each feature has an associated feature state. One or more features may always be enabled. If every feature associated with a given element is a permanently enabled feature, the element is also a permanently enabled feature that is always enabled. In other examples, the state of one or more features is dynamically determined during runtime. If all the feature states associated with an element are enabled, the element state is enabled. If all the elements associated with a request are enabled, the request is validated. A validated request is passed through the API stack for processing to generate a response to the validated request. However, if one or more feature states of a feature from a set of features mapped to a given element is disabled or hidden, the state of the given element is disabled. If the element state is disabled, the request is invalidated and the request is rejected.

Aspects of the '155 patent contemplate a centralized control within a REST API to limit or select which features are exposed to clients. The toggle feature permits a developer to map an element to a set of features within a system platform at build time. In other words, tagging a set of features to an element at build time enables the developer to turn an element on or off at the feature level. The user does not have to manually edit code associated with APIs as a given platform changes, to accommodate new platforms, or to conform to changes in features or feature content. Instead, features are toggled on or off to dynamically and flexibly accommodate changes to platforms, license agreements, feature content, and so forth.

The embodiments described herein provide for an expression-based feature toggle process that provides a flexible way to define features required by an element. The embodiments also support the scenario when the element requires only one of the specified features to be enabled. For expression validation, the system first evaluates an expression value at a single highest level (in a multi-level configuration), followed by lower levels, and then converges the result to a produce a final response that is more granular than existing techniques. While the embodiments described herein provide for three levels, it will be understood that greater or fewer levels may be employed in order to realize the advantages of the embodiments described herein.

Referring to FIG. 1, an exemplary block diagram illustrates a computing system 100 for implementing the expression-based feature toggle component. In FIG. 1, a system 100 for responding to API queries received from one or more clients is shown. The system 100 may be implemented as a server-client network. However, aspects of the embodiments described herein are not limited to networked systems.

A computing device 102 may be any type of computing device, such as, but not limited to, a server. The computing device 102 may include a web server, an application server, a file server, a back-end server, a cloud server, storage array, storage system, or any other type of computing device. In another example, the computing device 102 is associated with a data storage system. In still another example, the computing device 102 may be any type of server for request processing. In yet another example, computing device 102 may represent a group of processing units or group of networked computing devices. The computing device 102 executes the computer executable program code 104 (e.g., as application(s) 106, operating system functionality, or both) to implement the operations and functionality associated with the computing device 102. In some examples, the computing device 102 includes at least one processor 108, a memory area 110 associated with a memory storage device 124, and at least one user interface component 112. The processor 108 includes any quantity of processing units and is programmed to execute the computer executable program code 104 for implementing aspects of the embodiments.

The computer executable program code 104 may be performed by the processor 108 or by multiple processors within the computing device 102, or performed by a processor external to the computing device 102. In some examples, the processor 108 is programmed to execute the computer executable program code 104 such as those illustrated in, e.g., FIG. 3.

The computing device 102 further has one or more computer readable media such as the memory area 110. The memory area 110 includes any quantity of media associated with or accessible by the computing device 102. The memory area 110 may be internal to the computing device 102 (as shown in FIG. 1), external to the server (not shown), or both (not shown). In some examples, the memory area 110 includes read-only memory (ROM) and/or memory wired into a computing device.

The memory area 110 stores, among other data, the computer executable program code 104 and the one or more application(s) 106. The application(s) 106, when executed by the processor 108, operate to perform the functionality on the computing device 102. Exemplary application(s) 106 include without limitation, mail server application programs, web services, address book services, messaging programs, and the like. The applications may communicate with counterpart applications or services such as web services accessible via a network 126. For example, the applications may represent server-side applications executing in a cloud that corresponds to downloaded client-side services.

The computing device 102 may further include one or more computer executable components. Exemplary components include a communications interface component 114, an application programming interface (API) component 116, a system management component 118, and a toggle feature 128. In this example, components, such as communications interface component 114, API component 116, and the system management component 118 are separate components from application(s) 106. However, in other examples, the communications interface component 114, API component 116, and the system management component 118 are included within the application(s) 106 of the memory area 110.

The API component 116, when executed, causes the processor to process API queries received from a client. The computing device 102 returns a response to the client via the API component 116. In this non-limiting example, the API component 116 is a representational state transfer (REST) API processing REST API requests. However, the embodiments are not limited to implementation by a REST API.

REST API follows a client-server model, as shown in FIG. 1. REST API is stateless. Each request from a client includes the information for the computing device 102 to service the request. In other words, the state to handle the request is included within the request itself, whether as part of a uniform resource identifier (URI), query-string parameters, body, or headers.

The URI uniquely identifies the resource and the body contains the state (or state change) of that resource identified in one or more elements of the request. After the computing device 102 processes the request, the piece(s) of state data that matter are communicated back to the client via headers, status, and/or the response body.

In REST, the client includes all information needed by the computing device 102 to fulfill the request within the request message itself. For example, a client may send a GET request specifying one or more properties of one or more instances of a resource (also referred to herein as an object). An exemplary client request for values of two fields of a POOL object is as follows:

GET http s://10.108.49.209/api/types/pool/instances? fields-sizeTotal,sizeUsed

Pool reflects the resource and the fields reflect the properties. This GET request includes two properties within a property field parameter, "sizeTotal" and "sizeUsed." This exemplary request maybe issued by a client to request the object properties "sizeTotal" and "sizeUsed" for a POOL object. The property "sizeTotal" may represent the total size or total amount of storage associated with the POOL. The property "sizeUsed" may represent the amount of pool storage that has been used.

In some examples, the communications interface component 114 includes a network interface card and/or computer executable program code (e.g., a driver) for operating the network interface card. Communication between the computing device 102 and other devices, such as client 120 and client 122, may occur using any protocol or mechanism over any wired or wireless connection.

In some examples, the user interface component 112 includes a graphics card for displaying data to the user and receiving data from the user. A user may be anyone interacting with the user interface component 112. In some examples, the user is a customer. However, the examples are not limited to users that are customers and may include any user.

The user interface component may also include computer executable program code (e.g., a driver) for operating the graphics card. Further, the user interface component 112 may include a display (e.g., a touch screen display or natural user interface) and/or computer executable program code (e.g., a driver) for operating the display.

The system management component 118 may execute within the computing device 102. The system management component 118 optionally parses requests received by the computing device 102 and performs validation of the requests. In some examples, the system management component 118 may include a feature toggle 128. The feature toggle 128 is a component for identifying one or more features in a plurality of features mapped to one or more elements defined in a REST model. A feature tag may be employed to identify a feature mapped to a given element. However, in the embodiments described herein, the feature toggle includes the capability to provide complex dependencies for APIs with respect to a set of features in order to support two scenarios in which some elements require one of the specified features while other elements require all of the specified features. The dependencies may be built using an expression (e.g., a Backus-Naur form (BNF) expression) to describe the dependencies. A BNF expression is provided as: | expression::=and_expression|or_expression
and_expression::=featureName|'&&' and_expression
or_expression::=featureName |'||' or_expression
featureName::=text '&&' is introduced to represent the element requiring all features specified, and '||' is introduced to represent the element requiring one of the features specified. The feature toggle information is persisted in a database. In an embodiments, the database is a metadata table (not shown) that describes an API (API metadata table). Tables illustrating these features are shown and described in FIGS. 4 and 5.

The API metadata table provides a definition of the corresponding API. For example, an API metadata table may be created for each resource, such as file system, LUN, hard disk, fan, host, DNS server, or any resource of a system to include physical and virtual resources.

In some examples, one or more elements are mapped to one or more features. In other examples, one or more elements associated with an API are always enabled. In such cases, the element is not mapped to any features. The permanently enabled element requires zero features.

The feature toggle 128 determines the feature state of the one or more features associated with the element dynamically during runtime based on a plurality of criteria. In some example, the criteria include, without limitation, licenses, black content, platform, or any other criteria. A feature state may be enabled, disabled or hidden feature state.

The feature toggle 128 enables improved control of API features. The feature toggle 128 may be used to prevent users from using an API and/or prevent users from looking up the code for an API.

The feature toggle 128 is dynamic enough to enable features to be flexibly enabled, disabled, or blocked based on the client's system, the software version or software release, licensing, or any other reason for disabling API relative to a particular user and/or a particular client computing device. In some examples, the feature toggle 128 is built into the operating system (not shown).

The system management component 118 optionally includes a types-feed component 130. The types-feed component accesses the API metadata tables to conduct searches based on user (types-feed) requests and generates responses to types-feed requests in accordance with feature states.

In this example, the computing device 102 is connected via a network 126 to client 120 and client 122. The network 126 may include any type of network connection. In one example, the network 126 may be the Internet, an intranet, an Ethernet, or other wireless or hardwired connections by which the computing device 102 may send and receive data associated with one or more clients, such as, but without limitation, client 120 and/or client 122. However, other examples do not require a network 126.

Client 120 and client 122 represent any computing device executing instructions (e.g., as application programs, operating system functionality, or both) to implement the operations and functionality associated with the computing device. For example, client 120 may include a mobile computing device or any other portable device. In some examples, the mobile computing device includes a mobile telephone, laptop, tablet, computing pad, netbook, gaming device, and/or portable media player. The client 120 may also include less portable devices such as desktop personal computers, kiosks, tabletop devices, industrial control devices, wireless charging stations, and electric automobile charging stations. Additionally, the client 120 may represent a group of processing units or other computing devices. In still other examples, a client is any entity using a REST to communicate with a server or storage system.

In some examples, the client 120 includes one or more processors, a memory area, and at least one user interface. The processor includes any quantity of processing units and is programmed to execute computer executable program code for implementing aspects of the embodiments. The instructions may be performed by the processor or by multiple processors within the client 120 or performed by a processor external to the client 120.

Client 120 stores one or more applications in a client memory area (not shown). The one or more applications may include an API (not shown) for sending page-to-identifier queries to the computer device 102. The API at the client may be a REST API.

Other exemplary client-side applications may include mail application programs, web browsers, calendar application programs, address book application programs, messaging programs, media applications, location-based services, search programs, and the like. The applications may communicate with counterpart applications or services associated with computing device 102, such as web services accessible via the network 126. For example, the applications may represent downloaded client-side applications that correspond to server-side services executing in a cloud.

In the example shown in FIG. 1, the system 100 includes the computing device 102, network 126, client 120, and client 122. The system 100 may be implemented as a networked data processing system. However, the embodiments are not limited to a networked system including a server and multiple clients, as shown in FIG. 1.

In one example, the client 120 and computing device 102 may be implemented within a single computing device without a network connection. In another example, computing device 102 may be connected via a network to three or more client computing devices.

Figure 2:
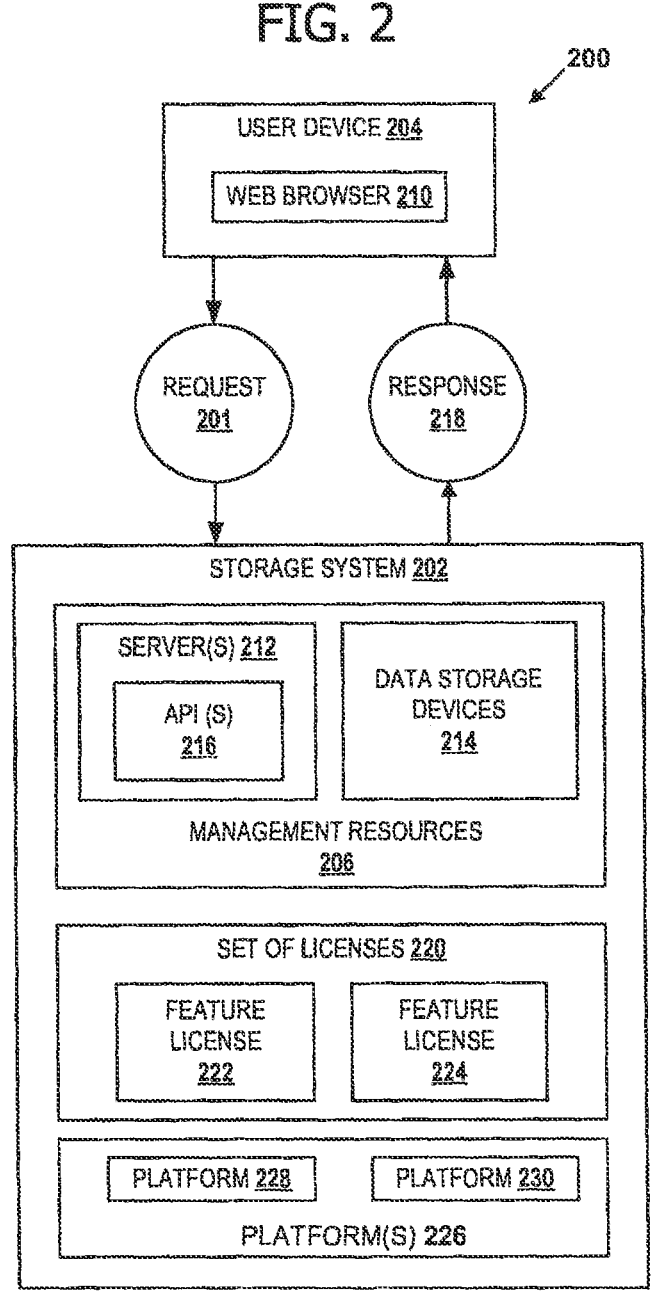
FIG. 2 is an exemplary block diagram illustrating a storage system for implementing the expression-based feature toggle component in an API in accordance with some embodiments.

Referring now to FIG. 2, an exemplary block diagram illustrates a request associated with a cloud storage system. System 200 is a system for processing requests in according with a feature toggle. Request 201 is an API request associated with one or more management resources 206 of a storage system 202. In some examples, the storage system 202 is a computing device, such as the computing device 102 in FIG. 1 The request 201 specifies a resource associated with one or more elements of the request. The user device 204 generates the request 201. The request 201 may be any type of request.

The user device 204 may be any type of device capable of generating and sending a request and receiving a response 218 from the storage system 202, such as, but not limited to, client 120 or client 122 in FIG. 1. For example, the user device 204 may be a desktop computer, a laptop computer, a tablet computer, a smart phone, or any other type of user device.

Storage system 202 is a data storage system including one or more management resources 206. The management resources 206 may include, for example and without limitation, one or more data storage devices 214, logical pools, logical units (LUNs), one or more servers 212, and any other hardware or software which may be associated with a cloud storage system.

The one or more data storage device(s) 214 include at least one data storage device. In some example, the one or more data storage device(s) 214 may include a data storage array. A data storage array includes a plurality of data storage devices. The data storage devices 214 may also include one or more types of data storage devices, such as, for example, one or more rotating disk drives, optical drives, and/or one or more solid state drives (SSDs), such as, but without limitation, flash drives.

The user device 204 may access storage system 202 resource and services via an application that utilizes the one or more API(s) 208, such as, but not limited to, a cloud storage gateway, a web-based content management system, or a web browser. For example, a web browser may generate and transmit the request 201 to storage system 202 via a web service API. The one or more server(s) 212 receive the request 201 via one or more APIs 216. In this non-limiting example, the APIs 216 include a REST API. The one or more servers 212 perform a preliminary validation of the request based on a set of features associated with one or more elements of the request 201. In some examples, a toggle feature associated with the one or more servers 212 performs the preliminary validation on each REST API request by querying the associated feature state of the REST element associated with the request. If at least one feature state indicates one or more features are disabled or hidden, the request 201 is invalidated and rejected. However, if all the feature states for the set of features required by an element of a request indicate enabled feature states, the request is validated and passed down the API stack for processing. The response 218 to the validated request is generated and returned to the user device 204.

An element state may be disabled if one or more features required by the element are not currently licensed by the user device 204. A set of licenses 220 includes one or more software licenses, such as an end-user license. In this example, the set of licenses 220 includes feature license 222 and 224. However, the set of licenses may include any number of licenses and is not limited to only two licenses as shown in FIG. 2. Using existing techniques, if one or more features associated with one or more elements of the request 201 is not licensed, the element state is disabled and the request 201 is rejected. In the embodiments described herein, access to features can be enabled and disabled in more granular fashion as described further herein.

Multiple different storage system platforms may be supported with the same operating system. In other words, a given operating system release may support one or more platform(s) 226. Each platform may support different features. In one non-limiting example, a given operating system release may support a virtual platform and three (3) hardware platforms, with varying capabilities.

A feature supported by one platform may not be supported by another platform. For example, a virtual platform supports virtual storage features, such as LUNs, file systems, etc. The virtual platform does not support any hardware features like disks, processors, fans, etc. Likewise, a hardware platform, such as, but without limitation supports hardware features such as the disks, fans, etc. In some non-limiting example, the platform 228 is a hardware platform. In these examples, platform 228 does not support file system features.

In other non-limiting examples, platform 230 is a virtual storage platform. In these examples, the platform 230 does not support features associated the fans and other hardware features.

Using existing techniques, an element state may be disabled if one or more features required by the element are not currently supported by a particular platform of the storage system 202 associated with the request. Thus, if one or more features associated with one or more elements of the request 201 are not supported by a particular platform, the element state is disabled and the request 201 is rejected. However, in the embodiments described herein, access to features can be controlled at a more granular level as will be described further herein.

As indicated above, a feature toggle performs a validation on requests. The feature toggle 314 parses a request to identify the corresponding element. The feature toggle may parse a set of feature tags to identify each feature in a set of features associated with each element.

The element may be any element associated with a request. In one non-limiting example, the element may be a throughput Limit Policy for a storage resource. The Limit Policy is a function for controlling allowed throughput to a resource. In other words, the Limit policy controls an amount of data written to or read from the resource and/or a speed with which data is read from and/or written to the resource.

In another example, an element may be method to create a logical unit (LUN). In still another non-limiting example, an element may be a GET properties query for a particular resource. In still another example, an element may be an allocate pool method.

The feature toggle checks a feature state for each feature in the set of features. The feature toggle determines whether each feature is enabled by checking a set of criteria. For example, the feature toggle checks the proper licenses(s), checks the platform hardware, checks the running software version, etc. The feature toggle determines if the feature is enabled, disabled, or hidden based on these criteria checks.

The set of features associated with the element includes one or more features from a plurality of features available on the server. For example, a file system element may be associated with a set of file system features. In another example, a LUN element may be associated with a set of block features.

The feature toggle checks one or more feature states associated with the features corresponding to element. Using existing techniques, if all the feature state(s) of features in the set of features associated with element are enabled, the element state is an enabled element state and the request is validated to form a validated request. The validated request is processed in accordance with the REST API(s) to generate a response, which is transmitted to the client 302.

Likewise, using existing techniques, if one or more of the feature state(s) include a disabled feature state and/or a hidden feature state, the element state is a disabled element state. If the element state is disabled, the request is invalidated to form a rejected request. The REST API(s) returns an error message including a reason for the rejection of the request. The reason for the rejection of the request may include, without limitation, one or more unlicensed features and/or one or more features unsupported on the storage system platform. An unlicensed feature is a feature that is not licensed by a user, a client, or other entity. In some examples, the error message is a user friendly message that provides a clear reason why the request is denied.

In some examples, the reason for the error message includes an unsupported feature associated with the element, an unlicensed feature associated with the element, an unrecognized feature, unavailable feature, or other error. For example, if a feature is disabled because it is not supported on a platform, an unsupported feature error may be returned. In another example, if a feature has a hidden feature state, such as when associated with black content, an unrecognized or unknown feature error may be returned. In still another example, if a feature is disabled because it is unlicensed, an unlicensed feature error is returned.

In the exemplary embodiments described herein, the feature access can be configured on a more granular level. For example, where some elements require one of the specified features and other elements require all of the specified features, the techniques described herein provide a way to represent both scenarios (e.g., using the BNF expression described above).

The computing device also supports a types-feed request. A types-feed request indicates a client request for all available property types associated with a particular resource. For example, a types-feed request may be utilized to dynamically search the API metadata table to determine what objects are available on the system. In other words, a user may send a types-feed query to ask for a listing of all objects or resources available to be queried by the client. A types-feed request may be used to determine which messages a user can call on one or more objects or resources. An exemplary types-feed request may include:

GET/api/types/disk.

This types-feed request in this non-limiting example is a GET request for all property types associated with a disk resource that are available and/or supported on the computing device 102. In addition, the API metadata table is enhanced with the additional dependencies information to provide more granular search results. In response to the request, a types-feed component (not shown) returns a list of property types of the disk resource associated with enabled and disabled feature that may be requested by the user in a types-feed response.

Figure 3:
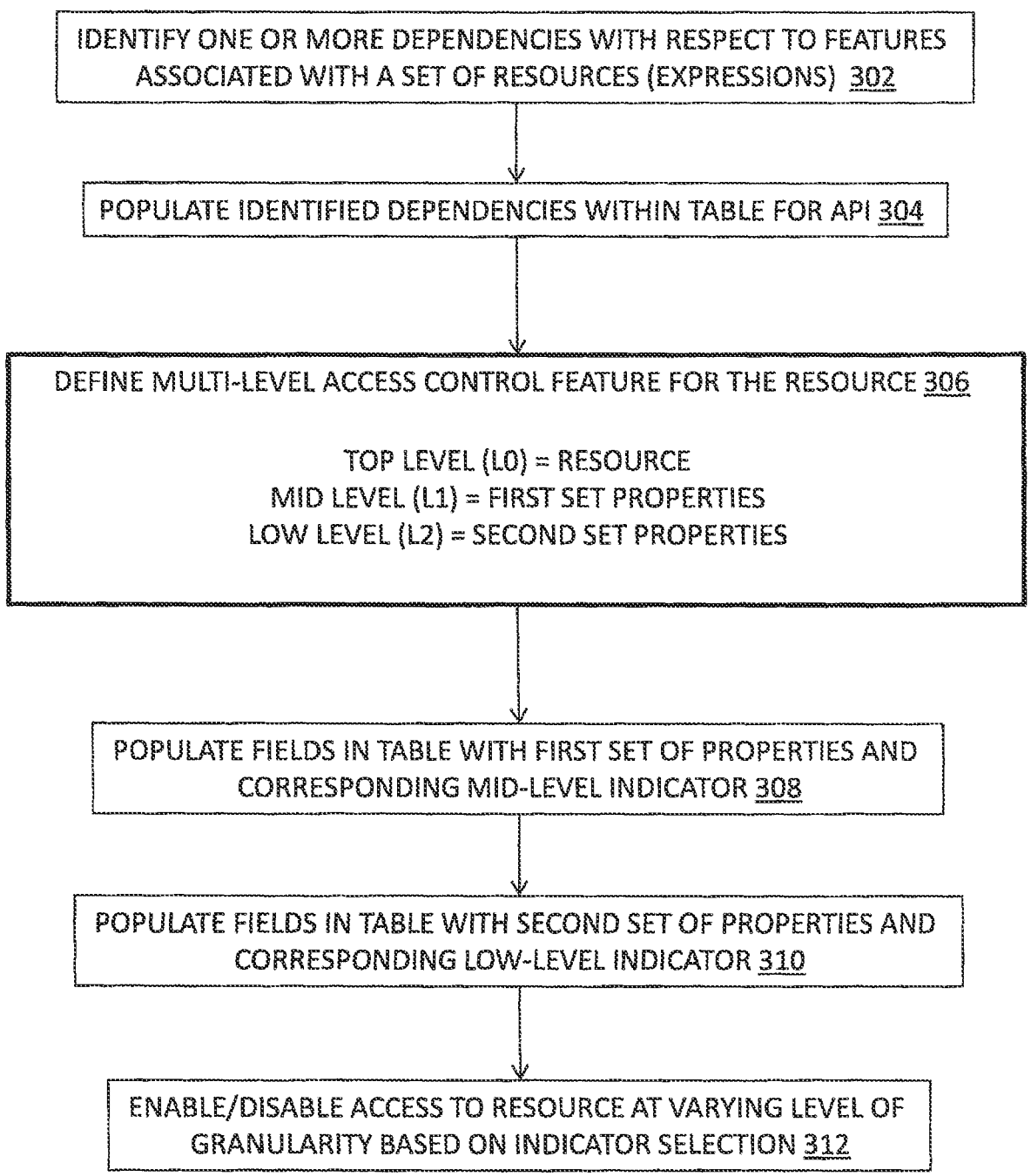
FIG. 3 is a flow diagram illustrating a process for implementing the expression-based feature toggle component in accordance with some embodiments.

Turning now to FIG. 3, a process 300 for implementing the expression-based feature toggle component for an API will now be described. In block 302, the process 300 identifies one or more dependencies, via the feature toggle component of the API, with respect to features associated with a set of resources. The dependencies may be defined via a first expression that is configured for a set of features to be enabled for the resource via the dependencies. The first expression indicates the resource requires all of the features specified for the resource. The dependencies may further be defined via a second expression that is configured for the set of features to be enabled for the resource via the dependencies. The second expression indicates the resource requires all of the features specified for the resource. The expressions can be concatenated to vary the dependencies. By way of one example, for a given set of features A,B,C,D,E, the features via the expressions can be configured as A+B OR C+D AND E.

In block 304, the process 300 populates the identified dependencies within a metadata table corresponding to the API. The metadata table defines features, properties, and arguments associated with the resource.

In block 306, the process 300 defines a multi-level access control feature for the resource. The multi-level access control includes a top level that identifies the resource, and a mid level that identifies a first set of properties for the resource. The first set of properties may include operations available for the particular resource (e.g., ADD, MODIFY, DELETE, etc.). The multi-level access control also includes a low level that identifies a second set of properties for the resource. The second set of properties may include arguments.

In block 308, the process 300 populates fields in the metadata table with the first set of properties and a corresponding mid-level indicator.

In block 310, the process 300 populates fields in the metadata table with the second set of properties and a corresponding low-level indicator.

In block 312, the process 300 enables and disables access to the resource at varying levels of granularity based on an indicator selection for the resource and the mid level-indicator or the low-level indicator for the first set of properties depending upon the selection.

The aspects described herein provide for two additional mechanisms in the metadata table. The first mechanism provides the expression type (e.g., a column represents the type of the expression). Based on the value, the system determines whether all specified features are required or only one of them is required. The second mechanism, referred to as, expression level, provides a hierarchy structure in which, e.g., if a resource is disabled any properties and methods of the resource is disabled as well. As a result, a second column in the table is provided to reflect the expression level. The level column is introduced to represent the hierarchy structure of the model system. Assume a resource is in a highest level (e.g., L0), which is the highest level. Then properties and methods (i.e., operations) are in the same level 1 (L1), which is lower than the resource level (referred to herein as a mid level). Arguments of the methods are provided in a low level (level L2), which is lower than the mid level. This information is significant because the higher level mechanism requirement would be applied to lower level mechanisms. In other words, the low level mechanisms inherit the aspects of the higher level mechanisms. To illustrate, if a resource requires one of feature F1 and feature F2 (feature1||feature2) and one property requires both feature F3 and feature F4 (feature3 && feature4), then the availability check would first check if the system has either F1 or F2 enabled and then check if both F3 and F4 are enabled.

As shown in FIG. 4, a table 400 illustrates feature requirements. The table 400 provides an element identifier, a feature identifier, any relationships among features (e.g., using the expression for dependency described above, and illustrative levels for the element (namely, resource level, property level, and argument level). FIG. 5 illustrates a table 500 with sample data for a particular element, "filesystem." The filesystem represents a resource and may be identified at the highest level L0. The table 500 includes a property name and a create method with 'size' as its parameter. The 'create method' represents an operation and may be identified at a mid level L1, while 'size' represents an argument and may be represented at a low level L2. The values presented in the columns "LS_AND" and "LEVEL" are also referred to as indicators, as they indicate a particular dependency (TRUE/FALSE) or a level ("0, 1, 2"). The features F1-F5 represent the features required for each element. The final expression for checking the availability for filesystem.action_create.argument_size is F1 && F2 && (F3||F4) && F5.

The expectation is that lower level (e.g., a larger value with the lower level) elements require higher level features. This means if we want to call the 'create method' with a size as its parameter, it would first check if the required feature by the file system is enabled. Secondly, the system would check if the required feature by the filesystem creation is enabled and then check if the feature required by the size argument is enabled. For each level, the system follows the BNF expression described above. A feature database table may be used to record the feature information including feature ID, description, feature state, and reason if the feature is disabled. A database storage procedure may be used to calculate the final state for the specific element based on the feature requirement definition illustrated in FIG. 4. By joining this feature requirement table to the feature table and the state calculation by the procedure, we can get the final availability state for each element.

As described above, for expression validation, the system first evaluates the expression value on the same level and then converges the result to a produce a final response. Thus, the expression-based feature toggle component provides a flexible way to define features required by the element. The embodiments also support the scenario when the element requires only one of the specified features to be enabled.

At least a portion of the functionality of the various elements in FIG. 3 may be performed by other elements in FIG. 1 and FIG. 2, or an entity (e.g. processor, web service, server, application program, computing device, etc.) not shown in FIG. 1 or FIG. 2.

In some examples, the operations illustrated in FIG. 3 may be implemented as software instructions encoded on a computer readable medium, in hardware programmed or designed to perform the operations, or both. For example, aspects of the embodiments may be implemented as a system on a chip (SoC) or other circuitry including a plurality of interconnected, electrically conductive elements.

While aspects of the embodiments have been described in terms of various examples with their associated operations, a person skilled in the art would appreciate that a combination of operations from any number of different examples is also within the scope of the embodiments.

Exemplary computer readable media include flash memory drives, digital versatile discs (DVDs), compact discs (CDs), floppy disks, and tape cassettes. By way of example and not limitation, computer readable media comprise computer storage media and communication media.

Computer storage media include volatile and nonvolatile, removable and non-removable media implemented in any method or technology for storage of information such as computer readable program code, data structures, program modules or other data. Computer storage media are tangible and mutually exclusive to communication media. Computer storage media are implemented in hardware and exclude carrier waves and propagated signals. Computer storage media for purposes of these embodiments are not signals per se. Exemplary computer storage media include hard disks, flash drives, and other solid-state memory. In contrast, communication media typically embody computer readable program code, data structures, program modules, or other data in a modulated data signal such as a carrier wave or other transport mechanism and include any information delivery media.

Although described in connection with an exemplary computing system environment, examples of the embodiments are capable of implementation with numerous other general-purpose or special purpose computing system environments, configurations, or devices.

Examples of well-known computing systems, environments, and/or configurations that may be suitable for use with aspects of the embodiments include, but are not limited to, mobile computing devices, personal computers, server computers, hand-held or laptop devices, multiprocessor systems, gaming consoles, microprocessor-based systems, set top boxes, programmable consumer electrics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the embodiments provided herein may be described in the general context of computer executable program code, such as program modules, executed by one or more computers or other devices in software, firmware, hardware, or a combination thereof. The computer executable program code may be organized into one or more computer executable components or modules. Generally, program modules include, but are not limited to, routines, programs, objects, components, and data structures that perform particular task or implement particular abstract data types. Aspects of the embodiments may be implemented with any number and organization of such components or modules. For example, aspects of the embodiments are not limited to the specific computer executable program code or the specific components or modules illustrated in the figures and described herein. Other examples of the embodiments may include different computer executable program code or components having more or less functionality than illustrated and described herein.

In examples involving a general-purpose computer, aspects of the embodiments transform the general-purpose computer into a special-purpose computing device when configured to execute the instructions described herein.

The examples illustrated and described herein as well as examples not specifically described herein, but within the scope of aspects of the embodiments, constitute exemplary means to implement feature toggle with REST API to disable and enable REST API features. For example, the elements illustrated in FIG. 1 and FIG. 2, such as the feature toggle 128 of FIG. 1, when encoded to perform the operations illustrated in FIG. 3, constitute exemplary means for a feature toggle to validate and invalidate requests received from clients. The elements illustrated in FIG. 1 and FIG. 2, and more specifically, the feature toggle 128 in FIG. 1, when encoded to perform the operations illustrated in FIG. 3 constitute exemplary means for implementing expression-based feature toggle in an API The order of execution or performance of the operations in examples of the embodiments illustrated and described herein is not essential, unless otherwise specified. That is, the operations may be performed in any order, unless otherwise specified, and examples of the embodiments may include additional or fewer operations than those disclosed herein. For example, it is contemplated that executing or performing a particular operation before, contemporaneously with, or after another operation is within the scope of aspects of the embodiments.

When introducing elements of aspects of the embodiments or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C.

Having described aspects of the embodiments in detail, it will be apparent that modifications and variations are possible without departing from the scope of aspects of the embodiments as defined in the appended claims. As various changes could be made in the above constructions, products, and methods without departing from the scope of aspects of the embodiments, it is intended that all matter contained in the above description and shown in the accompanying drawings shall be interpreted as illustrative and not in a limiting sense.

What is claimed is:

1. A method, comprising:
    identifying one or more dependencies, via a feature toggle component of an application programming interface (API), with respect to features associated with a set of resources;
    populating identified dependencies within a metadata table corresponding to the API;
    defining a multi-level access control feature for each resource in the set of resources, the multi-level access control including a top level that identifies the resource, and a mid level that identifies a first set of properties for each resource;
    populating fields in the metadata table with the first set of properties and a corresponding mid-level indicator; and
    enabling access to the resource at varying levels of granularity based on the identified dependencies in the metadata table for the resource and the mid level indicator for the first set of properties.

2. The method of claim 1, wherein the first set of properties at the mid level includes operations available for each resource.

3. The method of claim 1, wherein the defining the multi-level access control feature for each resource further comprises defining a low level that identifies a second set of properties for each resource;
    wherein enabling access to each resource at varying levels of granularity is further based on the low level-indicator for the first set of properties.

4. The method of claim 3, wherein the second set of properties includes arguments available for each resource.

5. The method of claim 1, wherein the metadata table defines features, properties, and arguments associated with the resource.

6. The method of claim 1, further comprising:
configuring, via a first expression, a set of features to be enabled for each resource via the identified dependencies, the first expression indicating each resource requires all features specified for each resource.

7. The method of claim 1, further comprising:
configuring, via a second expression, a set of features to be enabled for each resource via the identified dependencies, the second expression indicating the resource requires a subset of all the features specified for each resource.

8. The method of claim 1, wherein the API is a Representational State Transfer (REST) API.

9. A system, comprising:
a memory comprising computer-executable instructions; and
a processor executing the computer-executable instructions, the computer-executable instructions when executed by the processor cause the processor to perform operations comprising:
identifying one or more dependencies, via a feature toggle component of an application programming interface (API), with respect to features associated with a set of resources;
populating identified dependencies within a metadata table corresponding to the API;
defining a multi-level access control feature for each resource in the set of resources, the multi-level access control including a top level that identifies the resource, and a mid level that identifies a first set of properties for each resource;
populating fields in the metadata table with the first set of properties and a corresponding mid-level indicator; and
enabling access to each resource at varying levels of granularity based on the identified dependencies in the metadata table for each resource and the mid level-indicator for the first set of properties.

10. The system of claim 9, wherein the first set of properties at the mid level includes operations available for each resource.

11. The system of claim 9, wherein the defining the multi-level access control feature for each resource further comprises defining a low level that identifies a second set of properties for each resource;
wherein enabling access to each resource at varying levels of granularity is further based on the mid level-indicator for the first set of properties.

12. The system of claim 11, wherein the second set of properties include arguments available for each resource.

13. The system of claim 9, wherein the metadata table defines features, properties, and arguments associated with each resource.

14. The system of claim 9, wherein the operations further comprise:
configuring, via a first expression, a set of features to be enabled for each resource via the identified dependencies, the first expression indicating each resource requires all features specified for each resource.

15. The system of claim 9, wherein the operations further comprise:
configuring, via a second expression, a set of features to be enabled for each resource via the identified dependencies, the second expression indicating the resource requires a subset of all the features specified for each resource.

16. A computer program product embodied on a non-transitory computer readable medium, the computer program product including instructions that, when executed by a computer, cause the computer to perform operations, the operations including:
identifying one or more dependencies, via a feature toggle component of an application programming interface (API), with respect to features associated with a set of resources;
populating identified dependencies within a metadata table corresponding to the API;
defining a multi-level access control feature for each resource in the set of resources, the multi-level access control including a top level that identifies each resource, and a mid level that identifies a first set of properties for each resource;
populating fields in the metadata table with the first set of properties and a corresponding mid-level indicator; and
enabling access to each resource at varying levels of granularity based on the identified dependencies in the metadata table for the resource and the mid level-indicator for the first set of properties.

17. The computer program product of claim 16, wherein the first set of properties at the mid level includes operations available for each resource.

18. The computer program product of claim 16, wherein the defining the multilevel access control feature for each resource further comprises defining a low level that identifies a second set of properties for each resource;
wherein the second set of properties include arguments available for each resource; and
wherein enabling access to each resource at varying levels of granularity is further based on the mid level-indicator for the first set of properties.

19. The computer program product of claim 16, wherein the metadata table defines features, properties, and arguments associated with each resource.

20. The computer program product of claim 16, wherein the operations further comprise:
configuring, via a first expression, a set of features to be enabled for each resource via the identified dependencies, the first expression indicating each resource requires all features specified for each resource; and
configuring, via a second expression, a set of features to be enabled for each resource via the identified dependencies, the second expression indicating each resource requires a subset of all the features specified for each resource.

* * * * *